United States Patent Office 3,397,106
Patented Aug. 13, 1968

3,397,106
MICROCELLULAR LAMINATE
Walter William Moseley, Jr., Wilmington, Del., assignor to E. I. du Pont de Nemours and Company, Wilmington, Del., a corporation of Delaware
Filed Sept. 16, 1964, Ser. No. 396,891
9 Claims. (Cl. 161—55)

ABSTRACT OF THE DISCLOSURE

A fabric-like laminated sheet comprising plural layers of microcellular sheet material bonded to one another with an adhesive containing a dense, particulate filler material.

---

This invention relates to a novel sheet comprised of low-density, thermoplastic, microcellular material but having fabric-like properties of drape and conformability. More particularly it relates to a sandwich structure in which a dense, inert, particulate, filler material is uniformly distributed and bonded between layers of the microcellular material.

It is well-known in the prior art to produce low-density, thermoplastic, cellular materials, and these are prepared in sheet form by several methods generally involving either extrusion or casting. These cellular sheet products having a wide range of utility based on their low density, high strength-to-weight ratio, bulk, resilience, and attractive appearance. There are, however, many further uses of cellular sheet materials for which most of their properties are excellent but from which they are frequently excluded because of their low density and resultant low weight per unit of area.

When a customary fabric is laid over an object, it falls down in such a way that the general shape of the covered object is still apparent. The fabric is said to conform. A low density cellular sheet, however, frequently remains nearly flat or has so few awkwardly formed folds that, though covering the object, it poorly conforms to the object's shape.

Many cellular sheets may be colored and/or embossed to create beautiful drapery materials. Also, because of their usual water-proofness and ease of cleaning, they are very useful as, for instance, shower curtains. When they are hung as curtains, however, their extremely low weight prevents the formation of smooth, natural, fabric-like folds and they instead exhibit unattractive, irregular kinks and bends. In these applications, their low density prevents their having good drapeability.

Some cellular materials exhibit outstanding tensile strength and tear resistance which adapts them for use as, for example, protective coverings. Particularly effective for this application are certain ultramicrocellular sheet products, described in Belgian Patent No. 625,829, corresponding to U.S. Patent 3,227,664 and U.S. Patent 3,227,784, the disclosures of which are incorporated herein by reference. These sheets may be so lightweight that even moderate air currents cause them either to blow away or to flap so violently that even their high resistance to tearing is eventually dissipated.

Although the low density of cellular materials in sheet form is of great value in many applications and particularly contributes to their low cost, it frequently results in poor conformability, drapeability, and resistance to flapping.

This invention provides a sheet comprised of microcellular, low density, thermoplastic material and having, in addition to the appearance, resilience, bulk, and strength of the microcellular material, a weight per unit of area characteristic of heavy fabrics. A further provision of this invention is a sheet of microcellular material having improved properties of drape and conformability. A still further provision is an increased resistance to movement and flapping of the sheet when subjected to air currents. Other provisions will appear hereinafter.

These provisions result from the following invention which is a laminated sheet product having two or more layers of microcellular thermoplastic sheet material adhesively bonded face-to-face and having a dense, particulate, filler material uniformly distributed in the adhesive and sandwiched between one or more pairs of the layers of cellular material. The filler material is present at between 1 and 20 times the weight of the microcellular thermoplastic material in the laminated product.

Figure 1:
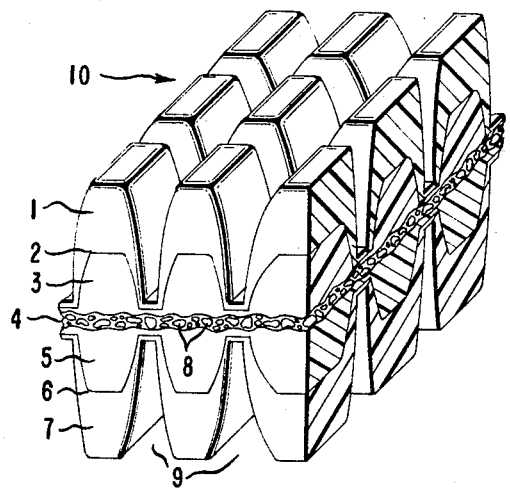
FIGURE 1 represents a preferred form of the sheet product of this invention cut to reveal its thickness in cross-section.

The invention utilizes what will be referred to as microcellular sheet materials, these being characterized as foams of a thermoplastic, polymeric substance, the cells of which are substantially polyhedral in shape and which, under microscopic examination, strongly resemble the inner bubbles of soap suds. Substantially all of the polymer is in the walls of these cells, each wall being a thin film whose thickness is less than about 2 microns. The thickness of a given cell wall is quite uniform and usually does not vary by more than ±30%. Thicknesses of adjacent cell walls seldom differ by more than a factor of 3. In a preferred embodiment of the invention the sheet materials are "ultramicrocellular" structures as described in aforementioned Belgian Patent 625,829; that is, as additional characteristics the polymer in the cell walls is highly crystalline and the walls exhibit uniplanar orientation and uniform texture, as hereinafter defined.

The invention has particular applicability to sheet materials composed of closed cells having an average transverse dimension across cells less than 1000 microns. A minor fraction of the cells may, however, have some walls normal to the direction of extrusion ruptured so that two or more cells form short tubes along the direction of extrusion. Conditions of extrusion are preferably selected to minimize the formation of these tubular cells.

The apparent density of the microcellular material should be between about 0.1 and 0.005 gm./cc. There should be at least about $10^3$ cells per cubic centimeter of the extruded material.

Cell wall thicknesses and transverse cell dimensions are determined by microscopic examination of cross-sections cut from the extruded microcellular sheet material. Sections from 20 to 60 microns thick may be cut from a frozen sample with a razor blade. Large cell (>50 microns in a transverse direction) samples are frozen directly in liquid nitrogen, but samples with smaller cells are preferably "imbedded" in water containing a detergent, frozen, and then sectioned. For very thin-walled samples (<1 micron), the wall thickness is best measured using an interferometer microscope. A layer of the sample is peeled off by contact with "Scotch Tape," freed from the tape by immersion in chloroform, and subsequently placed on the stage of the interferometer microscope for measurement.

The term "uniplanar orientation" as applied to the preferred ultramicrocellular structure can be understood from the following discussion. "Axial," "planar," and "uniplanar" indicate different types of crystalline orientation of high polymeric, crystalline materials. Axial orientation refers to the perfection with which the molecular chain axis within a sample is aligned with respect to a given direction, or axis, in the sample. Planar orientation refers to the perfection with which the molecular chain axis is oriented parallel to a surface of the sample. Conventional, two-way stretched films generally exhibit a degree of planar orientation. Uniplanar orientation is a higher type of polymer orientation in that it refers to the perfection with which some specific crystalline plane (which must include the molecular chain) in each polymer crystallite is aligned parallel to the surface of the sample. These three types of crystallite orientation may occur singly or in combinations; e.g., a sample might simultaneously exhibit uniplanar and axial orientation. A technique known as electron diffraction may be used to detect uniplanar orientation. The details of this measurement are to be found in above mentioned Belgian Patent No. 625,829.

The term "uniform texture," also applied to the cell walls of the preferred ultramicrocellular structures, means that the orientation, density, and thickness of the polymer in the walls are substantially uniform over the whole area of a cell wall, examined with a resolutiton of approximately 0.5 micron. This is best determined by observing the optical birefringence in the plane of a wall of a cell removed from the sample. In the birefringence test, the ultramicrocellular material in the sheet product of this invention will show a uniform extinction over the whole area of the cell wall. Lacy or cobweb-like cell walls and cell walls with a pebbly surface do not have uniform birefringence over the whole area of a cell wall; do not, therefore, have uniform texture; and are readily distinguished from the ultramicrocellular material of which the sheet product of this invention may be comprised.

The process by which a sheet of the preferred ultramicrocellular material is obtained comprises heating a confined mixture of a polymer plus at least one activating liquid (as hereinafter defined) to a temperature and pressure at which a homogeneous solution is formed, which temperature is greater than the boiling point of the liquid. (The term "boiling point" as used herein refers to the temperature at which a liquid boils under an external pressure of one atmosphere.) This homogeneous solution, either under autogeneous or higher pressure, is extruded abruptly through a sheet-forming orifice into a region of substantially lower pressure and temperature under such conditions that a very large number of bubble nuclei exist at the extrusion orifice. The conditions selected for extrusion are such that vaporization of the activating liquid, which produces the cellular structure, so rapidly cools the mass to the temperature at which the polymer precipitates that the orientation produced by the rapid extrusion and expansion is frozen (quenched) in the cell walls. Vaporization of the liquid, precipitation of the polymer, formation of the cells, and quenching of the oriented cell walls all occur within a small fraction of a second, i.e., about 0.01 second or less.

Characteristic of each activating liquid is a temperature above which adequate self-nucleation of bubbles occurs but below which the rate of nucleation is insufficient to produce ultramicrocellular material. The preferred temperature of the confined solution to be extruded is frequently lower than the self-nucleation temperature of the activating liquid, and another means for creating very rapid nucleation rates must be provided.

One means for obtaining the required high rates of bubble nucleation is the dissolving of a lower boiling additive in the solution. This additive assists nucleation by increasing the "internal pressure" and by lowering the surface tension of the solution. Although any soluble, low-boiling material is suitable, the preferred materials are those which are super-critical at temperatures above the polymer melting point. Useful additives include nitrogen, carbon dioxide, helium, hydrogen, methane, ethane, propane, ethylene, propylene, certain fluorinated and/or chlorinated methanes and ethanes, and equivalents.

A preferred means for inducing rapid bubble nucleation is the addition of a finely divided, solid, nucleating agent. This type of additive contributes nothing of itself to the pressure on the solution, allows continuous variation of pressure on the solution above its autogenous pressure, and affords excellent control of the rate of nucleation.

Suitable activating liquids for use in this process should have the following characteristics:

(a) The liquid should have a boiling point at least 25° C., and preferably at least 60° C., below the melting point of the polymer used;

(b) The liquid should be substantially unreactive with the polymer during mixing and extrusion;

(c) The liquid should be a solvent for the polymer under the conditions of temperature, concentration, and pressure required for extrusion;

(d) The liquids should dissolve less than 1% of the high polymeric material at or below the liquid's boiling point;

(e) The liquid should form a solution which will undergo rapid vaporization upon extrusion, forming a nongel polymer phase, i.e., a polymer phase containing insufficient residual liquid to plasticize the structure. In these requirements, the process differs radically from conventional foam-producing techniques. Choice of a suitable activating liquid is, of course, dependent on the particular polymer in question. Among those found especially useful are hydrocarbons and halogenated hydrocarbons, such as methylene chloride, fluorotrichloromethane, hexane, pentane, and ethyl chloride. Alcohols, such as methanol and ethanol, and alcohol/water mixtures are also frequently useful for this purpose.

The polymers suitable for the preferred ultramicrocellular materials are synthetic, crystallizable, organic polymers, e.g., polyhydrocarbons such as linear polyethylene, stereo-regular polypropylene or polystyrene; polyethers such as polyformaldehyde; vinyl polymers such as polyvinylidene fluoride; polyamides both aliphatic and aromatic, such as polyhexamethylene adipamide and polymetaphenylene isophthalamide; polyurethanes, both aliphatic and aromatic, such as the polymer from ethylene bischoloroformate and ethylene diamine; polyesters such as polyhydroxypivalic acid and polyethylene terephthalate; copolymers such as polyethylene terephthalate-isophthalate; and equivalents. The polymers must be of at least film-forming molecular weight, i.e. of inherent viscosity of at least 0.2 dl./gm. Inherent viscosity is defined as the quotient of the natural logarithm of the relative viscosity and the polymer concentration, 0.5 gm./dl. The relative viscosity is the quotient of the viscosity of the 0.5 gm./dl. solution of polymer and the viscosity, at the same temperature and in corresponding units, of the pure solvent used in forming the solution.

As aforementioned, one of the features of the preferred ultramicrocellular material is the high degree of polymer orientation in the cell walls, which contributes to the outstanding strength of these sheet structures. For this reason it is preferred to use polymers that become substantially stronger upon orientation. Such polymers include, for example, linear polyethylene, polypropylene, nylon, and polyethylene terephthalate.

Common polymer additives such as dyes, pigments, antioxidants, delusterants, antistatic agents, reinforcing particles, adhesion promoters, removable particles, ion exchange materials, ultraviolet stabilizers, and the like may be mixed with the polymer solution prior to extrusion, if desired.

The ultramicrocellular sheet produced as described may exhibit longitudinal corrugations. Sheet forming orifices useful in this process may be linear slots or preferably circular annuli (endless slots). When the orifice is a circular annulus, the ultramicrocellular product is in the shape of a tube which may be subsequently slit along its wall and opened up to form a flat sheet. The aforesaid corrugations then run along the length of the opened ultramicrocellular sheet, are nearly parallel to the direction of extrusion, and are generally, though not completely, uniform in size and shape.

A form of die which can be advantageously used in this process is a so-called "gear" die in which the orifice is generally a circular annulus (or similar endless slot) but which deviates periodically from the circular shape with constant amplitude and wave length such that it imposes corrugation on the extruded tube and maintains the total number of corrugations imposed per unit length of orifice the same, within a factor of about 2, as result from extrusion through a circular annular orifice of the same gap width and land length. The ultramicrocellular sheet obtained by extrusion through a gear die is improved in that the number of corrugations formed is exactly constant, and they are all parallel to the direction of extrusion and all the same size and shape.

If desired, the corrugations may easily be flattened by transverse tensioning, and the sheet may be caused to remain flat by a pressing or calendering operation. Alternatively, a flat sheet may be prepared directly by creating gas pressure within the extruding tube, thereby stretching the tube and flattening the corrugations. In either case, the corrugations are flattened but their previous existence is obvious from corresponding variations in thickness, surface texture, and/or optical properties. Again, the product obtained by extrusion through a gear die is superior in that these variations are parallel and uniform in size. These flattened single sheets are ordinarily less than about 0.125 in. (0.32 cm.) in thickness.

The formation of corrugations in the extruding tube is accompanied by very rapid flexing of the sheet. As a result, ultramicrocellular sheets are anisotropic; that is, tensile strength measured along the extrusion direction is 5 to 10 times greater than the transverse tensile strength. Likewise, it is relatively easy to initiate and propagate a tear along the extrusion direction, but a tear initiated in the transverse direction will not propagate that way since it immediately finds a weaker propagation path along the extrusion direction.

Products with nearly balanced properties can readily be produced by cross-lapping and laminating the single sheet products. Ordinarily, in a two-ply cross-lap, the two sheets will be arranged so that their extrusion directions are at right angles, or at an acute angle of at least 30 degrees. It is most surprising that such crosslapped sheets exhibit tremendous increases in tear strength as well as nearly balanced tensile and tear properties. Laminates comprised of more than two single sheets may, of course, be prepared in which case the extrusion directions of adjacent sheets should form acute angles of no less than 30 degrees and preferably should about equally divide the available 180 degrees.

Suitable bonding between the cross-lapped single sheets may be achieved either by the application of adhesives or by "self-bonding." Useful adhesives include solvent-based pressure sensitive adhesives, hot melt adhesives, and even a film of branched polyethylene which may be melted to join the surfaces. Self-bonding can be achieved without any applied adhesive by pressing the cross-lapped sheets at temperatures within a few degrees of the polymer melting point. The duration of heating should be held to a minimum to prevent appreciable relaxation of polymer orientation in the cell walls since prolonged heating may lead to a degradation in physical properties. If the degree of bonding attained is insufficient, the tremendous increases in tear strength of the cross-lapped product are not observed. It has been found that a bond strength or so-called "peel strength" in excess of about 0.1 lb./in. (18 gm./cm.), as measured by T.A.P.P.I. specification T–806–SM 46, is required to ensure that a substantial improvement in tear propagation strength will be realized before continued tearing of the laminate gives rise to failure by delamination. Ordinarily it is preferred that the peel strength be in excess of about 0.8 lb./in. (143 gm./cm.). It will be understood that these weak-channeled (corrugated) layers must be integrally bonded to one another, i.e., bonded essentially continuously throughout the planar dimensions of the laminate so that no substantial areas of the laminate exhibit peel strength values below about 0.1 lb./in. (18 gm./cm.).

For the cross-lapped laminate as a whole to be flexible, it is essential that the adhesives not only provide the aforementioned minimum peel strength but also be non-brittle. Rubbery adhesives having modulus values below about 50,000 p.s.i. (3500 kg./cm.$^2$), and preferably below about 5,000 p.s.i. (350 kg./cm.$^2$), are especially suitable for this purpose since they will not tend to fail at elongation up to the break elongations of the individual layers. The chemical nature of any adhesive employed will depend, of course, upon the properties of the layers to be joined. Typical, suitable adhesives include chloropene rubber, ethylene/vinyl acetate copolymers of 10–34% vinyl acetate, branched polyethylene, styrene butadiene rubber, polyalkylenether glycol polyurethanes, etc. These may be employed either in the form of aqueous dispersions or as organic solvent solutions. Pressures of from about 0.01 to 0.1 p.s.i. (.0007 to .007 kg./cm.$^2$) are effective for bonding the sheets without permanently decreasing the thickness of the microcellular sheets.

Either during the lamination step or on each single sheet, higher pressures may be exerted to produce a permanent reduction in thickness of the microcellular sheet, and this thickness reduction is accompanied with marked increases of tensile strength and work-to-break along the extrusion direction of the single sheets. A correspondingly high increase in these properties is thereby imparted to the cross-lapped laminate thus prepared as measured along any direction in the plane of the sheet. In general, the tear strength of a single sheet is increased by this pressing operation, but the great and surprising incease in tear strength results principally from cross-lapping and bonding two or more sheets as hereinbefore described.

The pressing temperature may range from room temperature or below up to the polymer melting point, but it is preferably kept well below the polymer melting point in the range of about 50 to 80° C. Naturally, the variables of maximum pressure, pressing temperature, and duration of pressure application are all inter-related, and any one may be adjusted toward some desired value by suitable change in the other two. The duration of pressing time is not critical and may range from a fraction of a second to several minutes or more. As pressure increases, the final stable sheet thickness generally decreases, which decrease can be carried to the extent of converting the soft, supple microcellular material to a paper-like material. For use in preparing the sheet product of this invention, the soft, supple character is preferably retained. Pressures useful for compaction without conversion to paper-like sheets range between those used for effecting good adhesive bonding up to about 10 p.s.i. (0.7 kg./cm.$^2$), and the density of such compacted sheets should be less than about 0.3 gm./cc., preferably less than 0.2 gm./cc.

The laminated ultramicrocellular sheet has, before any optional thickness reduction, an attractive, natural, leather-like, appearance. This appearance can readily be altered by embossing, however, to provide an almost limitless variety of surface patterns. Embossing may be accomplished simultaneously with thickness reduction of a single ultramicrocellular sheet, with bonding or pressing the laminate, or in an entirely separate operation. A particularly effective embossing pattern, which increases the flexibility of the laminated ultramicrocellular sheet, is one which impresses either regularly or irregularly spaced line patterns on the surface and which leaves the areas of microcellular material between the lines either uncompacted or only very slightly so. Deep embossing, if desired, may employ averaged platen pressures up to several hundred p.s.i. (7 to 40 kg./cm.²).

In the following, "single sheet" refers to a sheet of microcellular material as extruded and optionally flattened, compressed, and/or embossed. "Cross-lapped sheet" refers to a sheet comprised of two or more single sheets cross-lapped and laminated as described.

Figure 2:
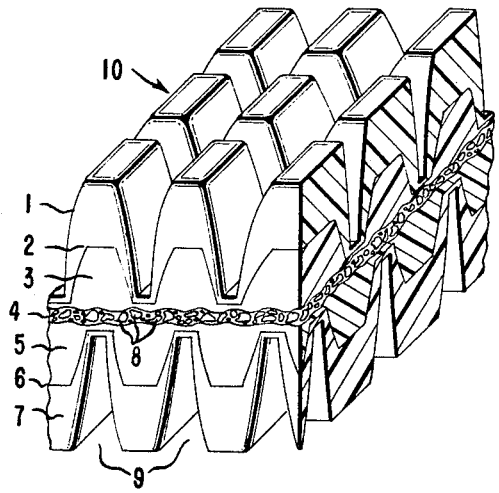
FIGURE 2 is the same as FIGURE 1 with the exception that the embossed patterns on both sides are not aligned.

A preferred embodiment of the present invention is illustrated by FIGURES 1 and 2 in which the sandwiched product is generally indicated by the number 10. Layers 1, 3, 5, and 7 are single microcellular sheets bonded at adhesive lines 2 and 6. Taken together, elements 1, 2 and 3 comprise an individual cross-lapped sheet, as do elements 5, 6 and 7. Sandwiched between these two cross-lapped sheets is an adhesive layer 4 containing a dense, particulate, inert material 8 of which each particle is substantially completely wet with adhesive 4 so that a good bond is created between elements 3 and 5.

Any inert, dense, particulate material 8 is satisfactory for this invention, but, because of its availability and low cost, sand is preferred. In the remainder of this specification the material 8 is referred to as sand, for brevity; but it is to be understood that both sand and its equivalents, without regard for cost or availability, are intended. Alternatively, silica, various silicates, talcs, inorganic salts, titanium dioxide, and the like in powdered or granular form may be substituted for sand 8.

To be effective in imparting the desired drape, conformability, and/or resistance to flapping in air currents, sand 8 must be present in appreciable quantity. The amount of sand 8 which can be sandwiched within adhesive line 4 is limited in that too much results in an adhesive line 4 which readily crumbles and separates. As is well-known to one skilled in the art, higher peel strengths between two adhered layers result from using a minimum effective quantity of adhesive; in the product of this invention, too much adhesive imparts a rubber-like character to the otherwise soft, supple, and fabric-like sheet. The optimum quantity of adhesive depends on the physical and chemical properties of both the adhesive and the surfaces to be joined, but adhesive quantities appreciably different from the optimum are frequently satisfactory in many applications.

The preferred method for applying sand 8 is to premix it in the desired ratio with adhesive solution to form a paste-like composition which is subsequently spread onto the surface or surfaces to be joined. This technique assures that each sand particle 8 is substantially completely wet with adhesive and greatly facilitates uniform distribution of the sand 8. The weight ratio of sand to adhesive solids should not exceed about 80:1 and preferably is less than or about 40:1. The minimum quantity of adhesive solids required to bond sheets of microcellular material without sand, e.g., adhesive lines 2 and 6, is about 0.1 oz./yd.² (3.2 gm./m.²); more adhesive is required when sand 8 is introduced, but the total quantity of adhesive solids in the sandwich structure 10 should not exceed about 1.25 times the total weight of microcellular material. The total amount of sand 8 in the sandwich structure can then be in the range of about 1 to 20, preferably 5 to 15, times the total weight of microcellular material.

Adhesives useful for mixing with sand 8 to create adhesive line 4 are the same as hereinbefore specified for adhesive lines 2 and 6.

Although each single microcellular sheet or each cross-lapped sheet thereof can be flattened, cross-lapped, bonded, reduced in thickness, and/or embossed prior to sandwiching the inert particles 8 between them, these operations are advantageously carried out in one pressing step after the microcellular sheets 1, 3, 5, 7 as extruded, the adhesives 2, 4, 6 and the sand 8 are layered as shown. The temperatures and pressures previously described for these operations apply regardless of the order in which these operations occur, and they are unchanged when sand 8 is distributed between two surfaces being joined.

The grooves 9 of FIGURES 1 and 2 represent deeply embossed patterns such as result when the sheet of this invention is embossed between two honeycomb-like embossing plates. Less severe embossing or none at all can be employed in the practice of this invention, especially when the laminates are thin. When the sandwich structures 10 are thick, i.e., about 0.25 in. (0.63 cm.) thick or more, thickness alone tends to render the sheets 10 less flexible. These thick structures are preferably deeply embossed as shown in FIGURES 1 and 2.

It is a surprising fact that, when the sandwich structure 10 especially of FIGURE 1, is compressed or embossed under average pressures as high as 1000 p.s.i. (70 kg./cm.²), the sand particles 8 neither tear or puncture the microcellular material nor are imbibed by it. Instead, the microcellular material conforms around the sand particles 8 and completely masks any visual evidence of their presence in the sandwich structure 10. Although heavier because of the added sand 8, the structure 10 has the same attractive surface appearance of a product containing only microcellular structure.

The maximum linear dimension of any sand particle 8 is not critical, but it must not exceed the sheet thickness between points of greatest incursion of any optional embossing pattern. In general, sand 8 which passes a 40 mesh screen (0.60 mm. diagonal dimension) is satisfactory, but preferably that which passes about 100 mesh (0.21 mm. diagonal dimension) is employed.

When the sheet product of this invention is produced as described, it has substantially all of the remarkable tear and tensile properties characteristic of the cross-lapped microcellular sheets on either side of adhesive line 4. It is the cross-lapping of the single sheets on either side, coupled with the anisotropic, weak-channeled nature of these single sheets, which imparts the high tear strength. If, for example, a sandwich structure is made with only a single sheet of microcellular material on each side of an intermediate sand layer and if these are in cross-lapped configuration, as previously described, then the resultant sandwich structure will possess a high degree of drape and conformability but may lack the very high tear strength which characterizes cross-lapped sheets containing no sand. For end uses where high tear strength is unimportant and where very thin sheets, that is, thinner than about 0.125 in. (0.3 cm.), are required, the sheet represented solely by a combination of elements 3, 4, 5 and 8 is excellent.

The number of single microcellular sheets which may be used in forming the sandwich structure of this invention is unlimited. Thus, the structure 10 of FIGURES 1 and 2 in no way imposes a limit of 4 single sheets. Moreover, as the number of single sheets exceeds 4, cross-lapping becomes less important because adequate tear strength for most applications results simply from the additive strength contributions of many single sheets. Use of cross-lapped sheets in the sandwich structure may often be desirable, but it is not a requisite of this invention.

Likewise, when multiple single sheets are laminated, sand 8 may be distributed between several pairs of adjacent sheet surfaces. When sand 8 is added at more than one adhesive line within the sandwich product, either both sand 8 and adhesive are equally divided among them or the amounts in any single adhesive line are adjusted so that, if all other sand-adhesive lines contained the same amounts, the sandwiched product would still fall within the above-stated limits for sand and adhesive quantities.

In the formation of thicker, that is, 0.25 in. (0.63 cm.) thick or more, sandwich structures which are softer and frequently more resilient, some of the single sheets of microcellular material can be of the type from which the corrugations hereinbefore described are not removed or flattened. Normally these corrugated sheets are not used for surface layers of the sandwich structure, but the corrugated sheets from extrusion through a gear die can be used advantageously to create a pleasing, regular, ribbed pattern for either surface of the structure.

By using multiple layers of microcellular sheets, a sandwich structure of any desired thickness can be obtained. When the thickness exceeds about 1 in. (2.5 cm.), however, the structure loses drapeability and gains from this invention principally a resistance to moving or flapping in air currents.

It will be understood that individual microcellular sheets in the sandwich products of the invention need not be identical but rather may be selected to have different properties depending upon the intended use. If desired, the surface of the product may also have an inert, dense, particulate material such as sand bonded adhesively to one or both of its outer surfaces. Furthermore, the sandwiched sheets products of this invention can be laminated to other sheet materials such as polymer films, fabrics, foils, and the like for special effects and uses. Coatings upon the sheets with synthetic resins, colorants and other materials are also contemplated within the scope of the invention.

Because cellular, foamed materials are normally of very low density, sheet products made from them are usually much less costly than, for instance, woven or knitted fabrics. The resultant low weight per unit of area, however, frequently precludes their replacement of fabrics in end uses requiring drape, conformability, or resistance to motion in air currents. The cellular sheets can be embossed to resemble fabrics, leather, paper, or virtually any other surface pattern. Many cellular materials are insensitive to water vapor and atmospheric gases, and some, primarily the closed-cell type, are waterproof, soil-resistant, and easily cleaned by wiping with soap and water. A cellular sheet structure incorporating a layer or layers of sand 8 according to this invention has a greatly increased area-weight without the loss of its other desirable properties, and the range of utility is thereby greatly extended, especially into end uses requiring fabric-like drap and conformability. This invention is particularly well suited for use in protective covers, window drapes, shower curtains, hospital cubical curtains, bath mats, throw rugs, and the like.

The following examples are illustrative of the invention but are not intended as a limitation thereof.

Example I

The following materials are charged to an elongated, cylindrical, 3-liter pressure vessel fitted at one end with an extrusion die and at the other end wtih a valved opening.

| | |
|---|---|
| Linear polyethylene _____gm__ | 1000 |
| Methylene chloride (room temp.) _____ml.__ | 750 |
| Chlorodifluoromethane _____gm__ | 133 |
| Silica aerogel _____gm__ | 5 |

The polymer used is "Alathon"-A7010, Lot No. 050934, E unit polyethylene resin, manufactured by E. I. du Pont de Nemours and Company, Inc., and having a melt index of 0.5 at 190° C. The silica aerogel is "Santocel"-54 manufactured by the Monsanto Chemical Company.

With the pressure vessel tightly sealed, it is rotated end-over-end for five hours in an air bath held at 150° C. The pressure vessel then has within it a uniform solution with silica aerogel uniformly dispersed throughout, and the autogenous solution pressure is 380 p.s.i.g. (26.7 kg./cm.$^2$). With rotation stopped so that the extrusion die faces downward, connection is made through the upper valved opening to a large nitrogen ballast tank under 410 p.s.i.g. (28.8 kg./cm.$^2$) pressure, under which pressure the contents of the pressure vessel is extruded to the atmosphere through the extrusion die. The extrusion die has an endless-slot, circular orifice 0.010 inch (0.0254 cm.) wide and 3.0 inches (7.62 cm.) in diameter. The extruded ultramicrocellular product, after transverse tensioning to flatten the corrugations, is about 0.035 inch (0.089 cm.) thick and weighs about 0.4 oz./yd.$^2$ (13.6 gm./m.$^2$).

A solution of rubber-base adhesive ("Scotch Tape" adhesive at 2% solids in chloroform) is applied with a brush to one face of a single 8 x 10 inch (20.3 x 25.4 cm.) ultramicrocellular sheet. After the adhesive has dried to form a tacky surface, sand which passes a 200 mesh standard sieve is sprinkled onto the sheet from a salt shaker. In like manner are applied in order a second adhesive layer, a second sand layer, and a third adhesive layer. A second ultramicrocellular sheet is coated on one surface with the adhesive and allowed to dry. The final composite structure of this invention results from sandwiching these two sheets together with adhesive surfaces in contact and with the machine direction of one sheet perpendicular to the machine direction of the other. The composite sandwich structure weighs approximately 18 oz./yd.$^2$ (610 gm./m.$^2$) of which about 0.8 oz./yd.$^2$ (27 gm./m.$^2$) is ultramicrocellular mtaerial, about 0.4 oz./yd.$^2$ (13 gm./m.$^2$) is adhesive solids, and about 16.8 oz./yd.$^2$ (570 gm./m.$^2$) is sand.

Three composite sheets as described are prepared. Two are pressed between pieces of woven jute at a nominal pressure of 500 p.s.i. (35.2 kg./cm.$^2$) for several minutes at room temperature to emboss a fabric pattern onto the ultramicrocellular sheet surfaces and to effect good bonding between them. The third composite is similarly pressed between 16 mesh wire screening, which also imparts a fabric-like pattern.

After the pressing operation, the three composite sheets are relatively stiff. Mechanically working them by hand imparts excellent flexibility and drape, but introduces wrinkles. A second pressing operation at 50 p.s.i. (3.5 kg./cm.$^2$) removes the wrinkles but leaves the embossed patterns and flexibility unchanged.

A fourth composite ultramicrocellular structure is made in identical manner except that its dimensions are 22 x 33 inches (56 x 84 cm.). For comparison, a fifth laminated sheet is prepared at the same larger dimensions but without any sand added. Each of these two sheets is separately centered over a spherical support of roughly the size of an adult fist. The sand-loaded fourth sheet drapes down around the sphere much as a man's handkerchief does, and forms a number of smoothly rounded folds. The sand-free fifth sheet, however, forms one single horizontal fold exactly as it would do if, instead of being laid on a sphere, it were laid across a horizontally supported rod or line. The incorporation of sand is seen to impart to the fourth composite sheet the appearance, weight, body, drape, and flexibility characteristic of a woven fabric.

When tested as a porch rug, the sand-bonded composite is found to be soft, resilient, and heavy enough to remain in place during use and in the presence of heavy breezes. The equivalent composite without sand is too lightweight for this use; it is pushed aside during normal walking and is blown aside by normal breezes.

Example II

The process of Example I is used to prepare another ultramicrocellular sheet product, but in this example the extrusion orifice is only 0.005 inch (0.0127 cm.) wide. Two sheets cut from this product are bonded together using the adhesive of Example I so that their machine directions are mutually perpendicular. Each single sheet has an area weight of approximately 0.2 oz./yd.$^2$ (6.8 gm./m.$^2$), and the cross-lapped sheet including adhesive weighs about 0.5 oz./yd.$^2$ (17 gm./m.$^2$).

An adhesive mixture is prepared having 8 parts by weight of 200 mesh sand to 1 part by weight of organic adhesive solids. This mixture is applied between two of the above cross-lapped sheets to form a composite sandwiched structure weighing approximately 7.0 oz./yd.$^2$ (237 gm./m.$^2$), of which about 0.8 oz./yd.$^2$ (27 gm./m.$^2$)

is ultramicrocellular material, 5.3 oz./yd.² (180 gm./m.²) is sand, and 0.9 oz./yd.² (30 gm./m.²) is adhesive solids.

This sandwiched sheet is pressed at room temperature between pieces of jute fabric under 250 p.s.i. (17.6 kg./cm.²), and then mechanically worked as in Example I. The resultant sheet thickness is 0.022 inch (0.056 cm.), and it has fabric-like appearance, drape, weight, and body. Used as a shower curtain it is found to be very serviceable.

No tendency for sand to leak out of or puncture the sandwiched structure is observed. Testing the mechanical strength and elongation at break of this sheet, and normalizing these results to the weight of microcellular material, shows it to be equivalent to a cross-lapped sheet without sand (see Table I). The Elmendorf tear strength (ASTM Specification No. D–869) is about one-third that obtained for sand-free, cross-lapped, ultramicrocellular sheets, but it is still many times greater than that of a single, noncross-lapped sheet. The added sand is shown, therefore, not to reduce tensile strength or elongation at break, and it leads to no serious reduction in tear strength.

transmission (a measure of breathability) is 341 gm. of water vapor per square meter per 24 hours.

TABLE II.—COMPOSITION OF SANDWICHED SHEET STRUCTURE

| Consecutive Layers | Material in or between layers | Material Weight (gm.) |
|---|---|---|
| 1 (bottom) | Ultramicrocellular sheet | 12.9 |
| 2 | Ultramicrocellular sheet | 13.3 |
|   | Red sand | 81.0 |
| 3 | Ultramicrocellular sheet | 12.2 |
|   | Red sand | 81.0 |
| 4 | Ultramicrocellular sheet | 13.0 |
|   | Red sand | 81.0 |
| 5 | Ultramicrocellular sheet | 11.1 |
|   | Red sand | 81.0 |
| 6 | Ultramicrocellular sheet | 13.4 |
|   | Red sand | 81.0 |
| 7 | Ultramicrocellular sheet | 13.5 |
|   | Red sand | 46.0 |
| 8 | Ultramicrocellular sheet | 20.5 |
| 9 | do | 25.8 |
| 10 (top) | do | 24.6 |
|   |   | ¹ 611.3 |

¹ Total.

TABLE I.—TENACITY AND TEAR STRENGTH COMPARISONS

|  | Tenacity | | Percent Elongation at Break | Elmendorf Tear Strength | |
|---|---|---|---|---|---|
|  | Lb./in.//oz./yd.² | Gm.cm./cm.²//gm./m.² |  | Lb.//oz./yd.² | Gm.//gm./m.² |
| Example II. Sand Composite (based on total weight) | 2.2 | 11.6 | 132 | 0.06 | 0.8 |
| Same, normalized to weight of ultramicrocellular material | 15.4 | 81.2 | 132 | 0.42 | 5.6 |
| Typical 2-ply crosslapped sheet, no sand | 14+ | 74+ | 100+ | 1.2 | 16.0 |
| Single-ply ultramicrocellular sheet (machine/cross directions) | 16/3 | 84.3/15.8 | 140/40 | *~0.01 | ~0.13 |

*Tears along MD only.

Example III

The process and apparatus of Example I are used to prepare ultramicrocellular single sheets of the same description. Ten 50 x 29 inch (127 x 74 cm.) flat sheets are cut and layered so that the machine direction of each sheet is perpendicular to that of its immediate neighbors. Some intersheet bonds are made using the 2% solids adhesive of Example I, but most are made using a paste comprised of this adhesive mixed with sand which passes a 100 mesh standard sieve. The sand is dyed red to provide a light pink tint in the final sandwich structure. The exact sheet structure is shown in Table II where, for clarity of presentation, adhesive is not mentioned but is understood to be distributed evenly between each pair of ultramicrocellular sheets. The resulting composite ultramicrocellular structure is then deeply embossed between metal embossing plates at 100° C. under 400 p.s.i. (28 kg./cm.²) for 3 minutes. The lower embossing plate has 12 x 12 square pegs per square inch (23.32 pegs per cm.²) with all adjacent pegs separated by the width of one peg. The upper embossing plate is a honeycomb having 0.16 x 0.16 x 0.05 x 0.16 x 0.16 x 0.05 inch (0.41 x 0.41 x 0.13 x 0.41 x 0.41 x 0.13 cm.) hexagonal cells. The final embossed structure is drapeable and resembles a woven scatter rug. It weighs about 19.5 oz./yd.² (662 gm./m.²) and is about 0.08 inch (0.20 cm.) thick.

A second sand-loaded composite is constructed as above except that it is reinforced between layers 7 and 8 with Du Pont Type 401 nylon yarn. Two yarn layers are formed so that the yarns in one layer are all perpendicular to those in the other and so that adjacent yarns in each layer are spaced about 0.5 inch (1.27 cm.) apart. It is embossed as described to yield a sheet having an area weight of about 20 oz./yd.² (679 gm./m.²), a thickness between 0.070 and 0.080 inch (0.18 and 0.20 cm.), and an average density of about 0.4 gm./cm.³. When a sample of this sheet is sealed over a small cup containing anhydrous calcium chloride and left in an atmosphere at 50% relative humidity and 75° C., the equilibrium moisture vapor

Example IV

The extrusion process and apparatus of Example I are used to prepare a polypropylene ultramicrocellular sheet, but the charge to the pressure vessel differs, as follows:

Stereo-regular polypropylene _____ gm__ 1000
Methylene chloride (room temp.) _____ ml__ 750
Dichlorodifluoromethane _____ gm__ 176
Silica aerogel _____ gm__ 2

The polymer used is "Profax"-6823 polypropylene resin having a melt flow at 230° C. of 0.4 and manufactured by the Hercules Powder Company. After six hours of rotation and heating in a 150° C. air bath, the pressure vessel contains a uniform solution exerting an autogenous pressure of 360 p.s.i.g. (25.3 kg./cm.² gage). As in Example I, extrusion is under pressure from a nitrogen ballast tank, which pressure is 400 p.s.i.g. (28.1 kg./cm.² gage). The extruded ultramicrocellular sheet is corrugated, having an area weight of about 2.6 oz./yd.² (87 gm./m.²) and an effective thickness of about 0.25 inch (0.62 cm.). The corrugations of this sheet extend lengthwise, and adjacent corrugations are lightly fused together. The corrugations may be flattened by transverse tensioning of the sheet. Thus, from the same extrusion, two different ultramicrocellular products are obtained: (1) a thick, corrugated ultramicrocellular pad, and (2) a flat, thin sheet resulting from stretching out the corrugations.

Five 25 x 40 inch (63.5 x 101.6 cm.) sheets are used in preparing the sandwich structure of this invention. The bottom sheet is of ultramicrocellular polyethylene as described in Examples I and III. The remaining four are of polypropylene according to the process of this example. The construction of this drapeable sheet is indicated by Table III.

TABLE III.—COMPOSITION OF SANDWICHED SHEET STRUCTURE

| Consecutive Layers | Material | Type | Weight (grams) |
|---|---|---|---|
| 1 (bottom) | Ultramicrocellular sheet | Flat | 8 |
| 2 | Ultramicrocellular pad | Corrugated | 60 |
|   | 40–60 mesh sand |  | 150 |
| 3 | Ultramicrocellular pad | Corrugated | 60 |
|   | 40–60 mesh sand |  | 150 |
| 4 | Ultramicrocellular pad | Corrugated | 60 |
| 5 (top) | Ultramicrocellular sheet | Flat | 12 |

The adhesive used is of the same composition as in Examples I, II, and III, and, where sand is applied, it is mixed with the adhesive solution first to form a paste.

The resulting composite ultramicrocellular sheet is about 1.0 inch (2.5 cm.) thick and is permanently reduced to 0.5 inch (1.27 cm.) in thickness in a flat press at 75° C. with 0.5 in (1.27 cm.) gage blocks between the platens for thickness control. Simultaneously, the two outer surfaces of the structure are embossed with a 16-mesh screening on one surface and the embossing plate with square pegs (as in Example III) on the other surface. The resulting 0.5 inch (1.27 cm.) thick sheet weighs 30 oz./yd.$^2$ (1020 gm./m.$^2$). It resembles a woven rug, is relatively dense, drapes well, lies flat when placed on the floor, and remains in place when used as a rug.

What is claim is:

1. In a laminated sheet product comprising plural layers of microcellular sheet material bonded to one another in face-to-face relationship and wherein said microcellular sheet material is composed of polyhedral-shaped thin-wall cells of a synthetic thermoplastic polymer; the improvement, for providing fabric-like properties of drape and conformability, comprising a layer of dense, particulate filler material interposed between at least one pair of adjacent layers of said sheet material, said layer of filler material being present in an amount between 1 and 20 times the weight of said microcellular sheet material in said product.

2. Product according to claim 1 wherein said filler material is sand.

3. Product according to claim 2 wherein said sand is of such size as to pass a 40 mesh screen.

4. Product according to claim 1 wherein said filler material is present in an amount between 5 and 15 times the weight of said microcellular sheet material in said product.

5. Product according to claim 1 wherein said plural layers of microcellular sheet material are bonded by flexible adhesive, the weight thereof being less than 1.25 times the weight of said microcellular sheet material in said product.

6. Product according to claim 1 wherein at least one of said layers of microcellular sheet material comprises two or more cross-lapped sheets bonded to one another.

7. Product according to claim 1 wherein said plural layers of microcellular sheet material are each on the order of about 1 inch in thickness or less.

8. Product according to claim 1 wherein said plural layers of microcellular sheet material are each on the order of about ¼ inch in thickness or less.

9. Product according to claim 1 wherein said microcellular sheet material comprises an ultramicrocellular structure with the cell walls exhibiting uniplanar orientation and uniform texture.

References Cited

UNITED STATES PATENTS

| 2,071,926 | 2/1937 | Geerlings | 161—145 XR |
| 2,986,198 | 5/1961 | Kolker et al. | 161—168 XR |
| 3,227,664 | 1/1966 | Blades et al. | 260—2.5 |

ROBERT F. BURNETT, *Primary Examiner.*

W. A. POWELL, *Assistant Examiner.*